United States Patent [19]

Sullivan

[11] Patent Number: 5,120,791

[45] Date of Patent: * Jun. 9, 1992

[54] GOLF BALL COVER COMPOSITIONS

[75] Inventor: Michael J. Sullivan, Chicopee, Mass.

[73] Assignee: Lisco, Inc., Tampa, Fla.

[*] Notice: The portion of the term of this patent subsequent to Dec. 5, 2006 has been disclaimed.

[21] Appl. No.: 559,177

[22] Filed: Jul. 27, 1990

[51] Int. Cl.$^5$ .............. A63B 37/12; C08K 3/14; C08K 3/30; C08L 33/02
[52] U.S. Cl. .................... 525/196; 525/221; 525/222; 525/919; 525/330.2; 273/235 R; 524/908; 524/432
[58] Field of Search ............... 525/194, 222, 221, 196, 525/919, 330.2; 524/908; 260/998.4; 273/235 R

[56] References Cited

U.S. PATENT DOCUMENTS 4,884,814 12/1989 Sullivan .............................. 524/423
4,911,451 3/1990 Sullivan et al. ..................... 524/908

Primary Examiner—James J. Seidleck
Assistant Examiner—Thomas Hamilton, III

[57] ABSTRACT

The present invention is directed to improved cover compositions for golf ball construction and the resulting golf balls produced utilizing the improved cover compositions. The novel golf ball cover compositions of the invention comprise a blend of hard ionomeric resins, preferably acrylic acid based ionomers, and recently developed acrylic acid based soft ionomers. When the cover compositions of the invention are utilized to manufacture golf balls, the golf balls produced thereby, exhibit properties of improved distance without sacrificing playability and/or durability when compared to known hard-soft ionomer blends.

14 Claims, No Drawings

GOLF BALL COVER COMPOSITIONS

BACKGROUND OF THE INVENTION

The present invention concerns improved hard-soft ionomeric resin mixtures (or blends) which are particularly well suited for the formulation of the cover composition of a golf ball.

More specifically, the present invention relates to novel golf ball cover compositions comprising blends of hard ionomer resins with recently developed soft ionomer resins made from acrylic acid based polymers. The new compositions of the present invention, when utilized for golf ball construction, particularly the construction of two piece golf balls, produce golf balls exhibiting enhanced travel distance without sacrificing the properties of playability and/or durability.

Ionomeric resins are polymers containing interchain ionic bonding. As a result of their toughness, durability, and flight characteristics, various ionomeric resins sold by E.I. DuPont deNemours & Company under the trademark "Surlyn ®" and more recently, by the Exxon Corporation (see U.S. Pat. No. 4,911,451) under the trademarks "Escor ®" and the tradename "Iotek", have become the materials of choice for the construction of golf ball covers over the traditional "balata" (trans polyisoprene, natural or synthetic) rubbers. The softer balata covers, although exhibiting enhanced playability properties, lack the durability necessary for repetitive play.

Ionomeric resins are generally ionic copolymers of an olefin such as ethylene and a metal salt of an unsaturated carboxylic acid, such as acrylic acid, methacrylic acid, or maleic acid. Metal ions, such as sodium or zinc, are used to neutralize some portion of the acidic groups in the copolymer resulting in a thermoplastic elastomer exhibiting enhanced properties, i.e. improved durability, etc., for golf ball cover construction over balata. However, the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight.

As a result, while there are currently more than fifty commercial grades of ionomers available from DuPont and Exxon with a wide range of properties which vary according to the type and amount of metal cations, molecular weight, composition of the base resin (i.e. relative content of ethylene and methacrylic and/or acrylic acid groups) and additive ingredients such as reinforcements, etc., a great deal of research continues in order to develop golf ball cover compositions exhibiting not only the improved impact resistance and carrying distance properties produced by the "hard" ionomeric resins, but also the playability (i.e. "spin") characteristics previously associated with the "soft" balata covers, properties which are still desired by the more skilled golfer.

In various attempts to produce such an ideal golf ball, the golfing industry has blended the hard ionomeric resins with a number of softer polymeric materials, such as softer polyurethanes. However, the blends of the hard ionomer resins with the softer polymeric materials have generally been dissatisfactory in that these balls exhibit numerous processing problems. In addition, the balls produced by such a combination are usually short on distance.

In addition, various "hard-soft ionomeric blends", i.e. mixtures of ionomer resins which are significantly different in hardness and/or flexural modulus, have been attempted. However, until the development of the specific blend combination set forth in U.S. Pat. No. 4,884,814, these balls were not particularly commercially viable. In this regard, although the balls produced using the hard-soft ionomer blends exhibited enhanced playability characteristics, they lacked the durability needed for continuous play.

U.S. Pat. No. 4,884,814, the present inventors previous patent, is directed to the finding that if various "hard" Surlyn ® methacrylic acid based ionomer resins (i.e. those Surlyn ® resins having a hardness of about 60 to 66 on the Shore D scale as measured in accordance with ASTM method D-2240) were blended with a number of specific "soft" Surlyn ® methacrylic acid based ionomer resins (i.e. those Surlyn ® resins having a hardness from about 25 to 40 as measured on the Shore D scale) that a golf ball cover composition could be produced that is not only softer than the prior art hard ionomer covers but also exhibits a suffficent degree of durability for repetitive play.

As a result, a golf ball covered in accordance with the "hard-soft" methylacrylic acid based ionomer blends of the '814 patent, exhibits properties of enhanced playability (i.e. softness and spin) and durability. However, notwithstanding the above, some sacrifice in carrying distance is also exhibited in comparison with the balls produced utilizing the hard Surlyn ® resins.

The present invention is directed to new golf ball cover compositions which exhibit properties of enhanced carrying distance (i.e. possess higher coefficient of restitution values) than the hard-soft ionomer blends set forth in U.S. Pat. No. 4,884,814, without sacrificing characteristics such as playability (i.e. softness and spin) and/or durability. It has been found that these properties can be produced using improved hard-soft ionomer blends containing recently developed acrylic acid based soft ionomer resins.

SUMMARY OF THE INVENTION

The present invention is directed to improved cover compositions for golf ball construction and the resulting golf balls produced utilizing the improved cover compositions. The novel golf ball cover compositions of the invention comprise a blend of hard ionomeric resins, preferably acrylic acid based ionomers, and recently developed acrylic acid based soft ionomers. When the cover compositions of the invention are utilized to manufacture golf balls, the golf balls produced thereby, exhibit properties of improved distance without sacrificing playability and/or durability when compared to known hard-soft ionomer blends.

Two of the principal properties involved in the performance of golf balls are resilience and hardness. Resilience is determined by the coefficient of restitution (C.O.R.), the constant "e", which is the ratio of the relative velocity of two elastic spheres after direct impact to that before impact. As a result, the coefficient of restitution (i.e. "e") can vary from zero to one, with one being equivalent to an elastic collision and zero being equivalent to an inelastic collision.

Resilience (C.O.R.), along with additional factors such as clubhead speed, angle of trajectory, and ball configuration (i.e. dimple pattern), generally determines the distance a ball will travel when hit. Since clubhead speed and the angle of trajectory are not factors easily controllable, particularly by golf ball manufacturers, the factors of concern among manufacturers are the coefficient of restitution (C.O.R.) and the surface configuration of the ball.

The coefficient of restitution (C.O.R.) in solid core balls is a function of the composition of the molded core and of the cover. In balls containing a wound core (i.e. balls comprising a liquid or solid center, elastic windings, and a cover), the coefficient of restitution is a function of not only the composition of the center and cover, but also the composition and tension of the elastomeric windings. Although both the core and the cover contribute to the coefficient of restitution, the present invention is directed solely to the coefficient of restitution which is affected by the cover composition.

In this regard, the coefficient of restitution of a golf ball is generally measured by propelling a ball at a given speed against a hard surface and measuring the ball's incoming and outgoing velocity electronically. As mentioned above, the coefficient of restitution is the ratio of the outgoing velocity to incoming velocity. The coefficient of restitution must be carefully controlled in all commercial golf balls in order for the ball to be within the specifications regulated by the United States Golf Association (U.S.G.A.). Along this line, the U.S.G.A. standards indicate that a "regulation" ball cannot have an initial velocity (i.e. the speed off the club) exceeding 255 feet per second. Since the coefficient of restitution of a ball is related to the ball's initial velocity, it is highly desirable to produce a ball having a sufficiently high coefficient of restitution to closely approach the U.S.G.A. limit on initial velocity, while having an ample degree of softness (i.e. hardness) to produce enhanced playability (i.e. spin, etc.).

The hardness of the ball is the second principal property involved in the performance of a golf ball. The hardness of the ball can affect the playability of the ball on striking and the sound or "click" produced. Hardness is determined as the deformation (i.e. compression) of the ball under various load conditions applied across the ball's diameter (i.e. the lower the compression value, the harder the material). As indicated in U.S. Pat. No. 4,674,751, "softer" covers permit the accomplished golfer to impart proper spin. This is because the softer covers deform on impact significantly more than balls having "harder" ionomeric resin covers. As a result, this allows the better player to impart fade, draw, or backspin to the ball thereby enhancing playability. Such properties can be determined by various "spin rate tests", such as the "nine-iron" spin rate test set forth below.

Accordingly, the present invention is directed to new hard-soft ionomer blends which produce, upon molding around solid or wound cores to formulate a cover composition, golf balls exhibiting enhanced distance (i.e. resilience) without adversely affecting, and in many instances, improving the ball's playability (i.e. hardness/softness) and/or durability (i.e. impact resistance, etc.) characteristics.

These and other objects and features of the invention will be apparent from the following description and from the claims.

DETAILED DESCRIPTION OF THE INVENTION

The present invention relates to improved cover compositions for golf ball construction. More particularly, the present invention is directed to improved blends of hard and soft ionomers, which, when utilized to formulate the cover stock of golf balls, produce golf balls having enhanced properties, including longer distance with similar or improved playability properties (i.e. higher Riehle compression, lower Shore hardness values, etc.), when compared to golf balls produced by the hard-soft ionomer blends of the prior art. The improved properties produced by the hard-soft ionomer blends of the present invention are due to the use of recently developed acrylic acid based soft ionomers, which produce cover compositions having lower flexural modulus and hardness (i.e. enhanced softness) and improved coefficients of restitution when incorporated with the hard ionomer resins indicated below.

The hard (high modulus) ionomers suitable for use in the present invention include those ionomers having a hardness greater than 50 on the Shore D scale as measured in accordance with ASTM method D-2240, and a flexural modulus from about 15,000 to about 70,000 psi as measured in accordance with ASTM method D-790.

The hard ionomer resins utilized to produce the cover compositions are ionic copolymers which are the sodium, zinc, magnesium or lithium salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

Preferably, the hard ionomeric resins are copolymers of ethylene and either acrylic and/or methacrylic acid, with copolymers of ethylene and acrylic acid the most preferred. In addition, two or more types of hard ionomeric resins may be blended into the cover compositions in order to produce the desired properties of the resulting golf balls.

Although the scope of the patent embraces all known hard ionomeric resins falling within the parameters set forth above, only a relatively limited number of these hard ionomeric resins are commercially available. In this regard, the hard ionomeric resins sold by E.I. DuPont de Nemours Company under the trademark "Surlyn ®", and the hard ionomer resins sold by Exxon Corporation under either the trademark "Escor ®" or the tradename "Iotek" are examples of commercially available hard ionomeric resins which may be utilized in the present invention in the particular combinations described in detail below.

The hard ionomeric resins introduced under the designation "Escor ®" and now sold under the new designation "Iotek", are somewhat similar to the hard ionomeric resins sold under the "Surlyn ®" trademark. However, since the "Iotek" ionomeric resins are sodium or zinc salts of poly(ethylene acrylic acid) and the "Surlyn" resins are zinc or sodium salts of poly(ethylene methacrylic acid) some distinct differences in properties exist. As more specifically indicated in the data set forth below, the hard Iotek resins (i.e. the acrylic acid based hard ionomer resins) are the more preferred hard resins for use in the present invention. In addition, various blends of "Iotek" and "Surlyn" hard ionomeric resins, as well as other available ionomeric resins, may be utilized in the present invention.

Examples of commercially available hard ionomeric resins which may be utilized in the present invention include the hard sodium ionic copolymer sold under the trademark "Surlyn 8940" and the hard zinc ionic copolymer sold under the trademark "Surlyn 9910". Surlyn 8940 is a copolymer of ethylene with methacrylic acid with about 15 weight percent acid which is about 29% neutralized with sodium ions. This resin has an average melt flow index of about 2.8. Surlyn 9910 is a copolymer of ethylene and methacrylic acid with about 15 weight percent acid which is about 58% neutralized with zinc ions. The average melt flow index of Surlyn 9910 is about 0.7. The typical properties of Surlyn 9910 and 8940 are set forth below in Table 1.

In addition, examples of the more pertinent acrylic acid based hard ionomer resins suitable for use in the present invention sold under the "Iotek" tradename by the Exxon Corporation include "Iotek 4000" (formerly "Escor 4000"), "Iotek 4010", "Iotek 8000" (formerly Escor 900), "Iotek 8020", and "Iotek 8030". The typical properties of the Iotek hard ionomers are set forth below in Table 2.

TABLE 2

Typical Properties of Iotek Ionomers

|  | ASTM Method | Units | 4000 | 4010 | 8000 | 8020 | 8030 |
|---|---|---|---|---|---|---|---|
| Resin Properties | | | | | | | |
| Cation type | | | zinc | zinc | sodium | sodium | sodium |
| Melt index | D-1238 | g/10 min. | 2.5 | 1.5 | 0.8 | 1.6 | 2.8 |
| Density | D-1505 | kg/m$^3$ | 963 | 963 | 954 | 960 | 960 |
| Melting Point | D-3417 | °C. | 90 | 90 | 90 | 87.5 | 87.5 |
| Crystallization Point | D-3417 | °C. | 62 | 64 | 56 | 53 | 55 |
| Vicat Softening Point | D-1525 | °C. | 62 | 63 | 61 | 64 | 67 |
| % Weight Acrylic Acid | | | | | 16 | | 11 |
| % of Acid Groups cation neutralized | | | | | 30 | | 40 |
| Plaque Properties (3 mm thick, compression molded) | | | | | | | |
| Tensile at break | D-638 | MPa | 24 | 26 | 36 | 31.5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore Hardness D | D-2240 | — | 55 | 55 | 61 | 58 | 59 |
| Film Properties (50 micron film 2.2:1 Blow-up ratio) | | | | | | | |
| Tensile at Break | | | | | | | |
| MD | D-882 | MPa | 41 | 39 | 42 | 52 | 47.4 |
| TD | D-882 | MPa | 37 | 38 | 38 | 38 | 40.5 |
| Yield point | | | | | | | |
| MD | D-8892 | MPa | 15 | 17 | 17 | 23 | 21.6 |
| TD | D-882 | MPa | 14 | 15 | 15 | 21 | 20.7 |
| Elongation at Break | | | | | | | |
| MD | D-82 | % | 310 | 270 | 260 | 295 | 305 |
| TD | D-882 | % | 360 | 340 | 280 | 340 | 345 |
| 1% Secant modulus | | | | | | | |
| MD | D-882 | MPa | 210 | 215 | 390 | 380 | 380 |
| TD | D-882 | MPa | 200 | 225 | 380 | 350 | 345 |
| Dart Drop Impact | D-1709 | g/micron | 12.4 | 12.5 | 20.3 | | |

The critical soft (low modulus) ionomers utilized to formulate the blends of the present invention are acrylic acid based soft ionomers. These soft ionomers may be generally characterized as comprised of sodium or zinc salts of a terpolymer of an olefin having from about 2 to 8 carbon atoms, acrylic acid, and an unsaturated monomer of the acrylate ester class having from 1 to 21 car-

TABLE 1

Typical Properties of Commercially Available Hard Surlyn ® Resins Suitable for Use in the Present Invention

|  | ASTM D | 8940 | 9910 | 8920 | 8528 | 9970 | 9730 |
|---|---|---|---|---|---|---|---|
| Cation Type | | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm$^3$ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, (kpsi), MPa | D-790 | (51) 350 | (48) 330 | (55) 380 | (32) 220 | (28) 190 | (30) 210 |
| Tensile Impact (23° C.) KJ/m$_2$ (ft.-lbs./in$^2$) | D-18225 | 1020 (485) | 1020 (485) | 865 (410) | 1160 (550) | 760 (360) | 1240 (590) |
| Vicat Temperature, °C. | D-1525 | 63 | 62 | 58 | 73 | 61 | 73 | bon atoms. Preferably, the soft ionomer is a zinc based ionomer made from an acrylic acid base polymer and an unsaturated monomer of the acrylate ester class. The soft (low modulus) ionomers have a hardness from about 20 to about 40 as measured on the Shore D scale and a flexural modulus from about 2,000 to about 10,000 psi as measured in accordance with ASTM method D-790.

More particularly, the present inventors have discovered that if the new acrylic acid based experimental soft ionomers recently developed by the Exxon Corporation for the Spalding Sports Worldwide, a division of Spalding & Evenflo Companies, Inc., Tampa, Fla., are utilized with the specific hard ionomers described above, in the combinations more clearly defined below and demonstrated in the Examples, not only are improvements in processability and clarity seen, but also the overall combinations, when utilized for golf ball construction, produce golf balls having higher coefficient of restitution values (i.e. longer distance) at equal or softer hardness than golf balls produced by known hard-soft ionomer blends, including the hard-soft ionomer blends utilized to produce Spalding's current Tour Edition ® ball.

In this regard, the inventors have found that when the new ethylene-acrylic acid based soft ionomer resins recently developed by the Exxon Corporation under the designation "Iotek 7520" (referred experimentally by differences in neutralization and melt indexes as LDX 195, LDX 196, LDX 218 and LDX 219) are combined with the known hard ionomers indicated above, the combination produces higher C.O.R.s at equal or softer hardness, higher melt flow (which corresponds to improved, more efficient molding, i.e. fewer rejects), as well as significant cost savings versus balls produced by known hard-soft ionomer blends due to lower overall raw materials cost and improved yields.

While the exact chemical composition of the resins to be sold by Exxon under the designation Iotek 7520 is considered by Exxon to be confidential and proprietary information, Exxon's Experimental Product Data sheet lists the following physical properties of the ethylene acrylic acid zinc ionomer developed by Exxon:

TABLE 3

Physical Properties of Iotek 7520

| Property | ASTM Method | Units | Typical Value |
| --- | --- | --- | --- |
| Melt Index | D-1238 | g/10 min. | 2 |
| Density | D-1505 | kg/m³ | 0.962 |
| Cation | | | Zinc |
| Melting Point | D-3417 | °C. | 66 |
| Crystallization Point | D-3417 | °C. | 49 |
| Vicat Softening Point | D-1525 | °C. | 42 |
| Plaque Properties (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebond | ISO 4862 | % | 52 |
| De Mattia Flex Resistance | D-430 | Cycles | >5000 |

In addition, test data collected by the inventors indicates that Iotek 7520 resins have Shore D hardnesses of about 32-36 (per ASTM D-2240), melt flow indexes of 3±0.5 g/10 min (at 190° C. per ASTM D-1288), a flexural moduluses of about 2500-3500 psi (per ASTM D-790). Furthermore, testing by an independent testing laboratory by pyrolysis mass spectrometry indicates that the Iotek 7520 resins are generally zinc salts of a terpolymer of ethylene, acrylic acid, and methyl acrylate.

As mentioned above and more clearly indicated below in the Examples, the recently developed ethylene-acrylic acid based soft ionomers (i.e. the Iotek 7520 resins) produce, when combined with various hard ionomers, particularly the Escor ® hard ionomers, golf balls exhibiting enhanced properties, including longer distance at similar or softer hardness, over known hard-soft ionomer blends including those set forth in the U.S. Pat. No. 4,884,814 concerning related subject matter. Along this line, while the '814 patent is directed to various hard-soft Surlyn ® ionomer blends which are similar to those blends utilized to formulate Spalding's current Tour Edition ® golf ball, the soft Surlyn ionomers (i.e. Surlyn 8265 and 8269) disclosed therein are of the poly(ethylene-methacrylic acid-butyl acrylate) type. The inventors have now discovered that the use of soft ionomers containing acrylic acid (i.e. Iotek 7520), as opposed to methacrylic acid (i.e. Surlyn 8265 and 8269), produce a more desirable golf ball in terms of distance and hardness (softness) while maintaining durability when used in combination with various known hard resins.

The superior golf balls of the present invention containing the improved hard-soft ionomer blends can be generally produced from a central core and an outer cover wherein the outer cover is made from a composition comprised of a blend of about 90 to about 10 percent of a hard ionomer of the type indicated above, and about 10 to about 90 percent of an acrylic acid based soft ionomer.

More preferably, it has been found that a golf ball exhibiting properties of enhanced travel distance (i.e. higher C.O.R. values) with similar or improved playability (i.e. softness characteristics) without a sacrifice in durability, can be produced from a core and a cover, wherein the cover is made from a composition comprised of about 70 to 30 percent of a hard ionomer resin, and about 30 to about 70 percent of an acrylic acid based soft ionomer, depending on the degree of softness desired.

Superior results may be achieved when the hard ionomers utilized are sodium or zinc salts of poly(ethylene acrylic acid) such as those sold by Exxon under the Iotek designation, particularly Iotek 4000 and Iotek 8000, and the soft ionomers utilized are the new acrylic acid based soft ionomers recently developed by Exxon under the designation Iotek 7520. The optimal ranges of hard to soft ionomers are from about 60 to about 40 percent hard ionomer and from about 40 to about 60 percent soft ionomer.

Additional materials may also be added to the compositions of the present invention, including dyes (for example, Ultramarine Blue sold by Whitaker, Clark, and Daniels of South Plainsfield, N.J.) (see U.S. Pat. No. 4,679,795), pigments such as titanium dioxide, zinc oxide, barium sulfate and zinc sulfate; UV absorbers; antioxidants; antistatic agents; and stabilizers. Moreover, the cover compositions of the present invention may also contain softening agents, such as plasticizers, processing aids, etc., and reinforcing materials such as glass fibers and inorganic fillers, as long as the desired properties produced by the golf ball covers of the invention are not impaired.

The cover compositions of the present invention may be produced according to conventional melt blending procedures. Generally, the hard ionomer resins are blended with the soft ionomeric resins in a Banbury type mixer, two-roll mill, or extruder prior to molding. The blended composition is then formed into slabs and maintained in such a state until molding is desired. If necessary, further additives such as inorganic fillers, antioxidants, stabilizers, and/or zinc oxide may be added and uniformly mixed before initiation of the molding process.

The golf balls of the present invention can be produced by molding processes currently well known in the golf ball art. Specifically, the golf balls can be produced by injection molding or compression molding the novel cover compositions about wound or solid molded cores to produce a golf ball having a diameter of about 1.680 inches and weighing about 1.620 ounces. The standards for both the diameter and weight of the balls are established by the United States Golf Association (U.S.G.A.). Although both solid core and wound cores can be utilized in the present invention, as a result their lower cost and superior performance, solid molded cores are preferred over wound cores.

Conventional solid cores are typically compression molded from a slug of uncured or lightly cured elastomer composition comprising a high cis content polybutadiene and a metal salt of an $\alpha$, $\beta$, ethylenically unsaturated carboxylic acid such as zinc mono or diacrylate or methacrylate. To achieve higher coefficients of restitution in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiator catalysts such as peroxides are admixed with the core composition so that on the application of heat and pressure, a complex curing or cross-linking reaction takes place.

The term "solid cores" as used herein refers not only to one piece cores but also to those cores having a separate solid layer beneath the cover and above the core as in U.S. Pat. No. 4,431,193, and other multilayer and/or non-wound cores.

Wound cores are generally produced by winding a very large elastic thread around a solid or liquid filled balloon center. The elastic thread is wound around the center to produce a finished core of about 1.4 to 1.6 inches in diameter, generally. Since the core material is not an integral part of the present invention, a detailed discussion concerning the specific types of core materials which may be utilized with the cover compositions of the invention are not specifically set forth herein. In this regard, the cover compositions of the invention may be used in conjunction with any standard golf ball core.

As indicated, the golf balls of the present invention may be produced by forming covers consisting of the compositions of the invention around cores by conventional molding processes. For example, in compression molding, the cover composition is formed via injection at about 380° F. to about 450° F. into smooth surfaced hemispherical shells which are then positioned around the core in a dimpled golf ball mold and subjected to compression molding at 200°–300° F. for 2–10 minutes, followed by cooling at 50°–70° F. for 2–10 minutes, to fuse the shells together to form an unitary ball. In addition, the golf balls may be produced by injection molding, wherein the cover composition is injected directly around the core placed in the center of a golf ball mold for a period of time at a mold temperature of from 50° F. to about 100° F. After molding the golf balls produced may undergo various further processing steps such as buffing, painting, and marking.

The resulting golf balls produced from the novel hard-soft ionomeric resin combinations of the present invention exhibit enhanced distance and playability properties over the art without sacrificing durability. This is due to the use of acrylic acid based ionomers as the soft ionomer in the overall cover stock composition.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLES

By blending the ingredients set forth in the Tables below, a series of cover formulations were produced. In the examples, cover formulations containing the acrylic acid based soft ionomers-hard ionomer blends of the present invention were compared with the hard-soft ionomer blends of the prior art including the hard-soft ionomer blend utilized to produce the current Tour Edition ® ball (see Examples 3 and 11) which is the subject of U.S. Pat. No. 4,884,814.

In addition, the properties produced by the cover compositions formulated with the acrylic acid based soft ionomer-hard ionomer blends of the present invention were compared to the properties produced by the cover materials representative of the Tour Edition ®, Tour Edition ® 100 and the Top Flite ® II balls currently being sold by Spalding & Evenflo Companies, Inc., Tampa, Fla., as well as a wide variety of competitive golf balls available in the market place. Although the specific formulations utilized to produce the Tour Edition ® 100 and Top Flite ® balls are proprietary, these formulations were utilized under the same processing conditions as those set forth below in order to produce covered golf balls for comparison purposes.

Along this line, the current Tour Edition ® ball is unique in that it is a two piece solid core, molded cover ball that meets the needs of golfers who demand superior control, historically obtained only with balata covered wound balls. It offers superior playability at the sacrifice of coefficient of restitution, which relates directly to distance.

The Tour Edition ® 100 ball has a slightly softer cover than the Tour Edition ® ball and utilizes a unique twin-dimple design. The Tour Edition ® 100 ball more closely meets the demands of the pro tour golfer than any other Spalding ball previously produced.

The Top Flite ® ball is considered to be a "hard" Surlyn or Iotek ionomeric resin ball. As a result of the ball's hardness, Top Flite ® ball is a difficult ball for golfers to control. Generally, the harder the golf ball, the more difficult it is for a golfer to impart spin to the ball, and hence, control the ball during flight. However, as a result of its outstanding durability and maximum distance, the ball is widely accepted by a large percentage of golfers.

The present invention is directed to various blends of hard ionomers and acrylic acid based soft ionomers, which, when utilized for golf ball cover construction, produce golf balls closely approaching the superior distance properties exhibited by the current Top Flite ® ball without sacrificing the playability characteristics of the current Tour Edition ® ball.

The cover formulations set forth below in Tables 4 and 5 were injection molded at 400° F. around identical solid type cores having a finished diameter of 1.545 inches to produce golf balls approximately 1.680 inches in diameter having nominal cover thickness of 0.0675 inches. The properties of Riehle compression, coefficient of restitution (C.O.R.), Shore Hardness, impact resistance, and spin rate for the cover formulation were determined. In Tables 4 and 5, Examples 3 and 11 are identical, and Examples 19 and 22 are similar in composition (i.e. different neutralization and melt index grades of Iotek 7520 where utilized). These Examples have been set forth for comparison purposes. The data for each example represents the average data for one dozen balls produced according to the desired manner. The properties were measured according to the following parameters:

Riehle compression is a measurement of the deformation of a golf ball in inches under a fixed static load of 225 pounds.

Coefficient of restitution (C.O.R.) was measured by firing the resulting golf ball is an air cannon at a velocity of 125 feet per second against a steel plate which is positioned 12 feet from the muzzle of the cannon. The rebound velocity was then measured. The rebound velocity was divided by the forward velocity to give the coefficient of restitution.

Shore hardness was measured in accordance with ASTM Test 2240.

Cut resistance was measured in accordance with the following procedure: A golf ball is fired at 135 feet per second against the leading edge of a pitching wedge, wherein the leading edge radius is 1/32 inch, the loft angle is 51 degrees, the sole radius is 2.5 inches, and the bounce angle is 7 degrees.

The cut resistance of the balls tested herein was evaluated on a scale of 1-5. 5 represents a cut that extends completely through the cover to the core; a 4 represents a cut that does not extend completely through the cover but that does break the surface; a 3 does not break the surface of the cover but does leave a permanent dent; a 2 leaves only a slight crease which is permanent but not as severe as 3; and a 1 represents virtually no visible indentation or damage of any sort.

The spin rate of the golf ball was measured by striking the resulting golf balls with a pitching wedge or 9-iron wherein the club-head speed is about 80 feet per second and the ball is launched at an angle of 26 to 34 degrees with an initial velocity of about 110-115 feet per second. The spin rate was measured by observing the rotation of the ball in flight using stop action Strobe photography.

Initial velocity is the velocity of a golf ball when struck at a hammer speed of 143.8 feet per second in accordance with a test as prescribed by the U.S.G.A.

TABLE 4

| INGREDIENTS | Formulations | | | | | | | | | |
|---|---|---|---|---|---|---|---|---|---|---|
| | 1 | 2 | 3 | 4 | 5 | 6 | 7 | 8 | 9 | 10 |
| Surlyn 9910 | 438 | — | 486 | 486 | 486 | — | — | — | — | — |
| Surlyn 8940 | 1370 | — | 108 | 108 | 108 | — | — | — | — | — |
| Surlyn 8269 | — | — | 832 | — | — | — | — | — | — | — |
| Surlyn 8265 | — | — | 362 | 362 | — | — | — | — | — | — |
| Surlyn White MB[1] | 193 | — | 193 | 193 | 193 | — | — | — | — | — |
| Escor 4000 (Iotek 4000) | — | 904 | — | — | — | 300 | 400 | 500 | — | — |
| Escor 900 (Iotek 8000) | — | 904 | — | — | — | 300 | 400 | 500 | 800 | 1000 |
| Escor White MB[2] | — | 193 | — | — | — | 193 | 193 | 193 | — | — |
| LDX-195 (Iotek 7520) | — | — | — | — | — | — | — | — | 988 | 788 |
| LDX-196 (Iotek 7520) | — | — | — | 832 | 1194 | 1188 | 988 | 788 | — | — |
| PROPERTIES | | | | | | | | | | |
| Shore C Hardness | 93 | 95 | 85 | 82 | 79 | 78 | 81 | 85 | 84 | 87 |
| Weight, grams | 45.6 | 45.7 | 45.7 | 45.7 | 45.8 | 45.8 | 45.8 | 45.7 | 45.7 | 45.7 |
| C.O.R. | .821 | .826 | .808 | .804 | .803 | .803 | .805 | .809 | .807 | .812 |
| Riehle Compression | 49 | 46 | 55 | 55 | 57 | 57 | 56 | 54 | 55 | 52 |
| Barrel Cold Crack | No breaks - any samples | | | | | | | | | |
| Cut Resistance (1 = best, 5 = worst) | 1-2 | 1-2 | 2-4 | 1-2 | 1-2 | 1-2 | 1-2 | 1-2 | 1-2 | 1-2 |
| SPIN PROPERTIES | | | | | | | | | | |
| Spin Rate (rpm) | 8707 | 8147 | 10037 | 10220 | 10451 | 10349 | 10057 | 9883 | 9903 | 9568 |
| Launch Angle | 32.10 | 32.96 | 30.51 | 30.19 | 29.93 | 30.07 | 30.38 | 30.77 | 30.77 | 31.16 |

[1]Surlyn White MB (master batch) is comprised of 74.9% Surlyn ® 8528, 23.7% Unitane 0-110, .24% Ultra Blue, 1.05% Unitex O.B. and .03% Santonox R.
[2]Escor (Iotek) White MB (Master Batch) is comprised of 74.9% Iotek 4000, 23.7% Unitane 0-110, .24% Ultra Blue, 1.05% Unitex O.B., and .03% Santonox R.

TABLE 5

| INGREDIENTS | Formulations | | | | | | | | | | | | |
|---|---|---|---|---|---|---|---|---|---|---|---|---|---|
| | 11 | 12 | 13 | 14 | 15 | 16 | 17 | 18 | 19 | 20 | 21 | 22 | 23 |
| Surlyn 9910 | 486 | 486 | 486 | 486 | 486 | — | — | — | — | — | — | — | — |
| Surlyn 8940 | 108 | 108 | 108 | 108 | 108 | — | — | — | — | — | — | — | — |
| Surlyn 8269 | 832 | — | 832 | — | 416 | — | — | — | — | — | — | — | — |
| Surlyn 8265 | 362 | 362 | — | — | 181 | — | — | — | — | — | — | — | — |
| Surlyn 8270[3] | — | 832 | 362 | 1194 | 597 | — | — | — | — | — | — | — | — |
| TG White MB[1] | 193 | 193 | 193 | 193 | 193 | — | — | — | — | — | — | — | — |
| Escor 4000 (Iotek 4000) | — | — | — | — | — | — | 857 | 554 | 454 | 354 | 554 | 454 | 354 |

TABLE 5-continued

| INGREDIENTS | Formulations | | | | | | | | | | | | |
|---|---|---|---|---|---|---|---|---|---|---|---|---|---|
| | 11 | 12 | 13 | 14 | 15 | 16 | 17 | 18 | 19 | 20 | 21 | 22 | 23 |
| Escor 900 (Iotek 8000) | — | — | — | — | — | 857 | — | 554 | 454 | 354 | 554 | 454 | 354 |
| Escor White MB[2] | — | — | — | — | — | 193 | 193 | 193 | 193 | 193 | 193 | 193 | 193 |
| LDX-218 (Iotek 7520) | — | — | — | — | — | 950 | 950 | 700 | 900 | 1100 | — | — | — |
| LDX-219 (Iotek 7520) | — | — | — | — | — | — | — | — | — | — | 700 | 900 | 1100 |
| PROPERTIES | | | | | | | | | | | | | |
| Weight, grams | 45.5 | 45.5 | 45.5 | 45.5 | 45.4 | 45.6 | 45.6 | 45.6 | 45.6 | 45.6 | 45.6 | 45.6 | 45.6 |
| Riehle Compression | 53 | 57 | 55 | 59 | 57 | 56 | 57 | 52 | 54 | 56 | 52 | 54 | 57 |
| C.O.R. | .807 | .804 | .808 | .802 | .806 | .807 | .800 | .811 | .807 | .803 | .810 | .805 | .802 |
| Shore C Hardness | 88 | 88 | 87 | 86 | 87 | 88 | 86 | 90 | 87 | 84 | 88 | 86 | 85 |
| Cut Resistance | 2-4 | 2-3 | 2-4 | 2-4 | 2-3 | 2-4 | 3-4 | 2-3 | 2-4 | 2-4 | 2-4 | 2-4 | 2-4 |

[1]Surlyn White MB (master batch) is comprised of 74.9% Surlyn ® 8528, 23.7% Unitane O-110, .24% Ultra Blue, 1.05% Unitex O.B. and .03% Santonox R.

[2]Escor (Iotek) White MB (Master Batch) is comprised of 74.9% Iotek 4000, 23.7% Unitane O-110, .24% Ultra Blue, 1.05% Unitex O.B., and .03% Santonox R.

[3]Surlyn ® 8270 is a low modulus, zinc neutralized poly(ethylene-methacrylic acid-butyl acrylate) ionomer similar in composition and properties to the sodium neutralized Surlyn ® 8265 and 8269 soft ionomers.

DISCUSSION OF THE EXAMPLES

The above examples indicate that the use of the new acrylic acid based soft ionomers (i.e. the Iotek 7520 resins) in combination with relatively hard ionomers (i.e. Surlyn ® 9910 and 8940, more preferably, Iotek 4000 or 8000) produce golf balls exhibiting higher C.O.R. values (i.e. thus better distance) while maintaining, and in many instances improving, the softness and playability characteristics of the balls when compared to golf balls produced with the methyacrylic acid based soft ionomers (i.e. Surlyn ® 8265 and 8269) currently used in the Tour Edition ® ball. In addition, the examples indicate that the improvements in softness and/or distance properties are produced without the expense of the cover composition's overall durability. As a result, the new ionomer cover formulations of the present invention produce golf balls which are longer in distance and softer than any other prior Spalding golf ball.

More particularly, Examples 1-2 represent golf ball cover compositions produced utilizing only hard ionomers. While these cover compositions produce golf balls exhibiting high C.O.R. (i.e. greater than 0.820) values, these balls are too hard to offer sufficient playability (Shore C Hardness greater than 90, and Riehle Compression less than 50).

Example 3 and Examples 11-15 represent the hard-soft ionomer cover blends which are the subject of U.S. Pat. No. 4,884,814, and are essentially equivalent to the current Tour Edition ® ball. Examples 12-15 vary depending on the type of methacrylic acid based soft Surlyn ® ionomer utilized.

Examples 6-10 and 16-23 represent the hard-soft ionomer blends of the present invention. When compared to the prior art golf balls (i.e. Examples 3 and Examples 11-15), these golf balls have higher C.O.R. values, while exhibiting improved playability characteristics. This is particularly demonstrated in Examples 19 and 22, the preferred embodiments of the present invention, which are representative of the chemical composition of the new Tour Edition ® ball (i.e. the Tour Edition ® 90 ball) soon to be introduced into the marketplace.

In addition, the data set forth in the Examples also indicate that the hard acrylic acid based ionomeric resins (i.e. Iotek 4000 and 8000), which are sodium or zinc salts of poly(ethylene acrylic acid), produce, when utilized with the new acrylic acid based soft ionomers of the present invention, cover compositions exhibiting enhanced C.O.R. values (thus, improved travel distance) at the same or similar hardness when compared with hard methyacrylic acid based ionomeric resins (i.e. Surlyn ® 9910 and 8940) which are sodium or zinc salts of poly(ethylene methacrylic acid). This can be seen in comparing Examples 6-10 with Examples 4 and 5. Thus, the more preferred compositions of the present invention comprise hard-soft ionomer blends comprised of acrylic acid based hard ionomeric resins with the acrylic acid based soft ionomeric resins.

Furthermore, because the new acrylic acid based soft ionomeric resins available from Exxon under the Iotek designation (i.e. Iotek 7520) contain no wax or other processing additives (i.e. it is believed that Surlyn ® 8265 and 8269 use 0.5-1 wt. % of a bis-stearamide wax to prevent clumping and mixing during processing), fairly substantial cost savings can be produced due to the potential elimination of epoxy primer, thereby reducing volatile emissions and improving whiteness. Moreover, use of the acrylic acid based soft Iotek ionomer resin offers a significant cost savings over the soft methacrylic acid based Surlyn ® ionomers not only in the overall cost per pound, but also because the new acrylic acid based soft ionomers are substantially softer than the methacrylic acid based Surlyn ® blends, lower levels can be utilized.

In addition to the above indicated test results, the distance and playability properties of the more preferred formulations of the present invention (i.e. Examples 19 and 22, which are representative of the chemical composition of Spalding's new, longer distance and slightly softer, Tour Edition ® 90 golf ball) were compared with various combinations of Spalding's current Tour Edition ® (TE), Tour Edition ® (TE 100), and Top Flight ® II (TF II) golf balls, as well as a number of competitive golf balls, and the following performance results were produced.

TABLE 6

DISTANCE TEST
Club: 90 Deg. Metal Wood Driver Club Head Speed (fps) 160

| Launch Conditions | Before Test | After Test |
| --- | --- | --- |
| Launch Angle | 8.3 | N/A |
| Ball Speed (fps) | 239 | N/A |
| Spin Rate (rpm) | 3232 | N/A |
| Turf Conditions | Firm | Firm and Dry |
| Wind | 1 mph | 3 mph |
| Temperature | N/A | 90 |
| Relative Humidity | N/A | N/A |

TEST RESULTS

| BALL TYPE | TRAJ. | FT. | CARRY | DIFF. | DEV. | ROLL. | TOTAL | DIFF. |
| --- | --- | --- | --- | --- | --- | --- | --- | --- |
| TFII | 13.1 | 6.4 | 254.8 | 0.0 | 0.6 | 18.5 | 273.3 | 0.0 |
| TE 100 | 14.4 | 6.8 | 251.6 | −3.2 | 2.0 | 15.5 | 267.2 | −6.2 |
| TE 90 | 12.8 | 6.5 | 251.6 | −3.2 | 1.0 | 19.6 | 271.2 | −2.1 |
| TITLEIST BALATA | 12.7 | 6.6 | 245.2 | −9.6 | 4.5 | 21.0 | 266.4 | −6.9 |
| TITLEIST DT | 12.9 | 6.6 | 250.0 | −4.8 | 2.4 | 18.5 | 268.5 | −4.8 |
| MAXFLI ST | 17.1 | 6.8 | 247.0 | −7.8 | −0.3 | 12.9 | 260.0 | −13.4 |
| MAXFLI BALATA | 13.1 | 6.6 | 246.3 | −8.5 | 1.7 | 19.9 | 266.2 | −7.2 |
| PRECEPT BALATA | 15.4 | 6.8 | 247.3 | −7.5 | 2.0 | 16.4 | 263.7 | −9.6 |

TABLE 7

DISTANCE TEST
Club: 5 iron Club Head Speed (fps) 125

| Launch Conditions | Before Test | After Test |
| --- | --- | --- |
| Launch Angle (deg.) | N/A | N/A |
| Ball Speed (fps) | N/A | N/A |
| Spin Rate (rpm) | N/A | N/A |
| Turf Cond. | Firm | Firm |
| Wind | 4 mph | 7 mph |
| Temperature | N/A | N/A |
| Relative Humidity | N/A | N/A |

TEST RESULTS

| BALL TYPE | TRAJ. | FT. | CARRY | DIFF. | DEV. | ROLL. | TOTAL | DIFF. |
| --- | --- | --- | --- | --- | --- | --- | --- | --- |
| TFII | 24.1 | 6.0 | 177.8 | 0.0 | 2.1 | 17.3 | 195.1 | −0.1 |
| TE 100 | 23.1 | 5.9 | 173.9 | −3.9 | 1.8 | 18.8 | 192.8 | −2.4 |
| TE 90 | 22.5 | 5.9 | 176.4 | −1.4 | 2.8 | 18.8 | 195.3 | 0.0 |
| TITLEIST BALATA | 22.6 | 5.8 | 173.7 | −4.1 | 4.4 | 21.0 | 194.6 | −0.6 |
| TITLEIST DT | 22.5 | 5.9 | 176.6 | −1.2 | 2.3 | 16.9 | 193.5 | −1.7 |
| MAXFLI ST | 23.8 | 5.9 | 172.0 | −5.8 | 2.5 | 19.4 | 191.4 | −3.8 |
| MAXFLI BALATA | 23.9 | 5.8 | 173.5 | −4.3 | 4.3 | 21.5 | 195.0 | −0.2 |
| PRECEPT BALATA | 23.8 | 5.8 | 170.3 | −7.5 | 3.6 | 20.8 | 191.1 | −4.1 |

Comments: Statistical analysis of the results shows that for TE 90 vs. (4) of the competitive brands (Titleist Balata, Maxfli St., Maxfli Balata, Balata Precept) the differences in total distance are very significant. This means the longer total distance is likely due to differences in ball performance and is not due to random choice.

TABLE 8

SPIN TEST

| Ball Type | Full Square Hit[1] | Standard Deviation |
| --- | --- | --- |
| Tour Edition | 9701 | 550 |
| Tour Edition 100 | 10181 | 290 |
| Tour Edition 90 | 9581 | 630 |
| Top Flite XL | 7635 | 772 |
| Titleist 384 Tour 100 | 9775 | 99 |
| Titleist Tour 100 | 9830 | 232 |
| Titleist DT 90 | 7700 | 882 |
| Maxfli ST | 8228 | 735 |
| Maxfli DDH | 9276 | 231 |
| Bridgestone Precept | 9050 | 253 |
| Wilson Staff | 6989 | 719 |

[1]The full (square hit) was performed utilizing a Johnny Miller Finesse wedge with its face oriented for a square hit.

In view of the above test results, as well as additional data produced by internal testing, the following performance profile of the more preferred formulation of the present invention (i.e. Examples 19 and 22 concerning the new softer Tour Edition ® 90 golf ball) has been developed:

1. In machine tests, the Tour Edition ® 90 distance off the #5 iron and driver is longer than the current Tour Edition ® 100 with slightly lower trajectory.
2. The Tour Edition ® 90 is equal to the Top Flite ® II in distance off the #5 iron and although two yards shorter than the Top Flite ® II off the driver, it is significantly longer off the driver than the top competitive brands.
3. Spin off a full #9 iron is equal to the Tour Edition ® and slightly less than the Tour Edition ® 100.
4. Durability in lab testing is equal to the Tour Edition ® or Tour Edition ® 100.

As a result, the new hard-soft ionomer blends of the present invention produce golf balls exhibiting properties of enhanced distance and playability without sacrificing durability.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A golf ball comprising a core and a cover, wherein said cover comprises:

from about 90 to about 10 percent by weight of a hard ionomer which is a sodium or zinc salt of the copolymer of an olefin having from 2 to 8 carbon atoms and an unsaturated monocarboxylic acid from 3 to 8 carbon atoms, wherein said hard ionomer has a hardness greater than 50 on the Shore D scale and a flexural modulus of from about 15,000 to about 70,000 psi; and, from about 10 to about 90 percent by weight of an acrylic acid based soft ionomer which is a sodium or zinc salt of a terpolymer of an olefin having 2 to 8 carbon atoms, acrylic acid, and an unsaturated monomer of the acrylate ester class having from 1 to 21 carbon atoms, wherein said soft ionomer has a hardness from about 20 to about 40 on the Shore D scale and a flexural modulus of from about 2,000 to 10,000 psi.

2. The golf ball of claim 1, wherein the hard ionomer is a sodium or zinc salt of the copolymer of ethylene and acrylic acid.

3. The golf ball of claim 1, wherein the soft ionomer is a zinc salt of a terpolymer of ethylene, acrylic acid and methyl acrylate.

4. The golf ball of claim 2, wherein said cover composition comprises from about 70 to about 30 percent by weight of the hard ionomer and from about 30 to about 70 by weight percent of the soft ionomer.

5. The golf ball of claim 3, wherein said cover composition comprises from about 70 to about 30 percent by weight of the hard ionomer and from about 30 to about 70 by weight percent of the soft ionomer.

6. The golf ball of claim 1, wherein said cover composition comprises from about 60 to about 40 percent by weight of the hard ionomer and from about 40 to about 60 percent by weight of the soft ionomer.

7. The golf ball of claim 3, wherein said cover composition comprises from about 60 to about 40 percent by weight of the hard ionomer and from about 40 to about 60 percent by weight of the soft ionomer.

8. A golf ball comprising a core and a cover, wherein said cover comprises a blend of from about 70 to about 30 percent by weight of an acrylic acid based hard ionomer and from about 30 to about 70 percent by weight of an acrylic acid based soft ionomer.

9. A golf ball comprising a core and a cover, wherein said cover comprises a blend of from about 70 to about 30 percent by weight of a hard ionomer which is a sodium or zinc salt of an ethylene-acrylic acid copolymer and from about 30 to about 70 percent by weight of a soft ionomer which is a zinc salt of a terpolymer of ethylene, acrylic acid and methyl acrylate.

10. The golf ball of claim 9, wherein the hard ionomer is a blend of from about 70 to about 30 weight percent of an ethylene-acrylic acid copolymer which is neutralized with a zinc ion and from about 30 to about 70 weight percent of an ethylene-acrylic acid copolymer which is neutralized with a sodium ion.

11. The golf ball of claim 9, wherein the hard ionomer is a blend of from about 70 to about 30 weight percent of an ethylene-acrylic acid copolymer containing about 16% by weight acrylic acid with about 30% of the carboxylic acid groups neutralized by zinc ions and from about 30 to 70 weight percent of an ethylene-acrylic acid copolymers containing about 11% by weight acrylic acid having about 40% of the carboxylic acid groups neutralized with sodium ions.

12. The golf ball of claim 1, wherein said cover comprises a mixture of one or more pigments, an optical brighteners and/or dye.

13. The golf ball of claim 8, wherein said cover comprises a mixture of one or more pigments, an optical brighteners and/or dye.

14. The golf ball of claim 9, wherein said cover comprises a mixture of one or more pigments, an optical brighteners and/or dye.

* * * * *